United States Patent [19]

Stoffels

[11] 3,933,063

[45] Jan. 20, 1976

[54] TURRET ROLL SLITTING MACHINE

[75] Inventor: Carl A. Stoffels, Flemington, N.J.

[73] Assignee: Judelshon Industries, Inc., Jersey City, N.J.

[22] Filed: Oct. 2, 1974

[21] Appl. No.: 511,197

[52] U.S. Cl. .................... 82/85; 82/48; 82/92; 82/101

[51] Int. Cl.$^2$..... B23B 3/04; B23B 5/14; B23B 7/00

[58] Field of Search......... 82/46, 48, 59, 70.1, 70.2, 82/71, 72, 79, 80, 83, 84, 85, 86, 87, 91, 92, 93, 96, 100, 101

[56] References Cited

UNITED STATES PATENTS

| | | | |
|---|---|---|---|
| 2,114,272 | 4/1938 | Temple | 82/100 X |
| 2,701,015 | 2/1955 | Gottschalk | 82/92 |
| 3,166,964 | 1/1965 | Judelson | 82/101 X |
| 3,302,500 | 2/1967 | Hackenberger et al. | 82/101 X |
| 3,324,750 | 6/1967 | Tarerha | 82/70.1 |
| 3,368,434 | 2/1968 | Meyer | 82/92 X |
| 3,383,965 | 5/1968 | Snyderman | 82/101 |
| 3,481,234 | 12/1969 | Luce, Sr. | 82/85 |
| 3,748,934 | 7/1973 | Lezberg | 82/48 |

*Primary Examiner*—Harrison L. Hinson
*Attorney, Agent, or Firm*—Amster & Rothstein

[57] ABSTRACT

A multiple shaft, turret roll-slitting machine having a slitting knife mounted for movement along a path parallel to the axis of a roll to be slit and for radial movement into the roll at selected axial locations. The machine has at least two shafts upon which rolls of material are to be mounted and those shafts are movable from a cutting station to a loading and unloading station and are mounted on a turret to achieve such movement. When a first shaft is in the cutting station, it is oriented relevant to the slitting knife such that it can be slit into narrow width tape or ribbons by the slitter. At the same time, a second shaft is located in the loading and unloading station such that a previously slit roll can be removed and a new roll can be loaded into the shaft while the roll on the first shaft is being cut. The turret is then indexed reversing the positions of the first and second shafts.

9 Claims, 7 Drawing Figures

FIG. 4.
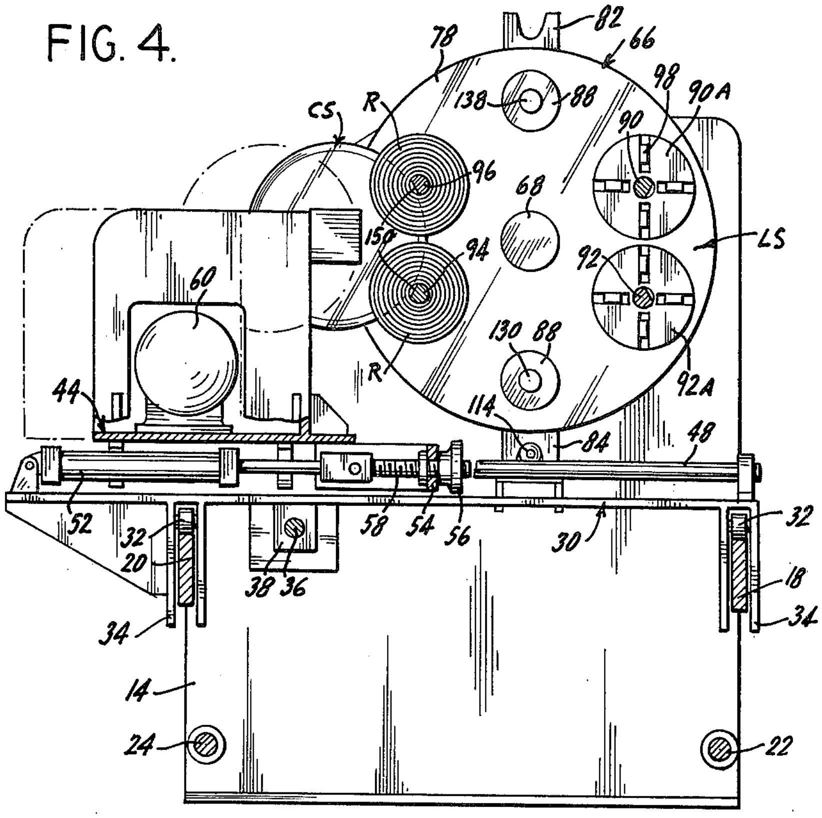
FIG. 5.
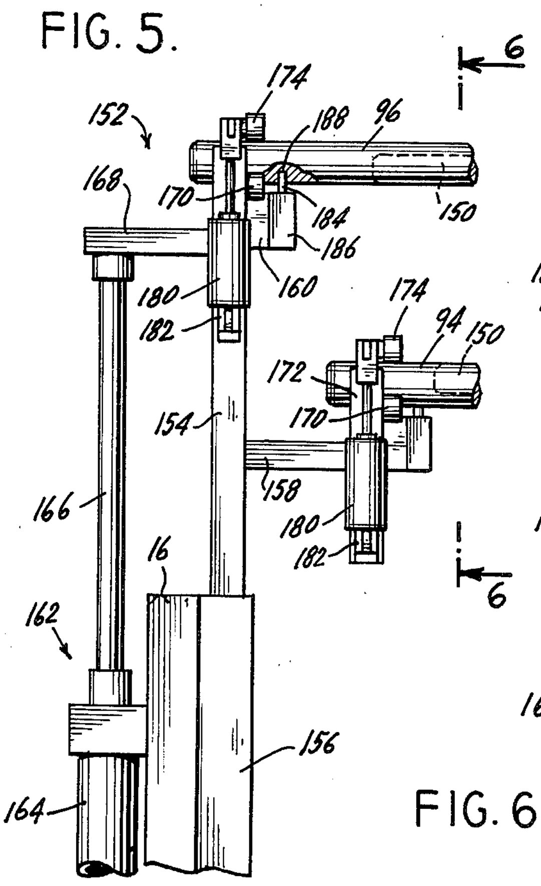
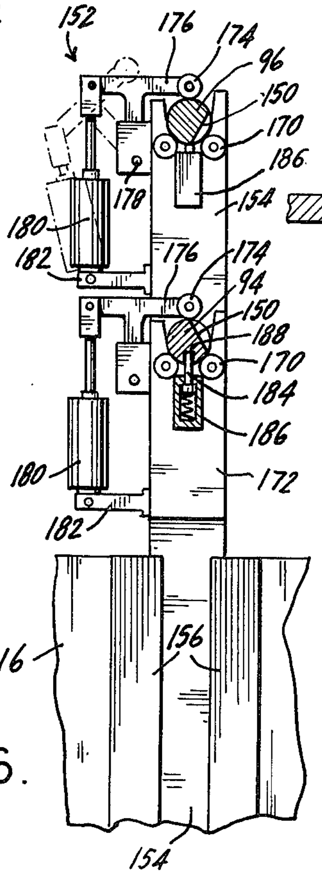
FIG. 6.
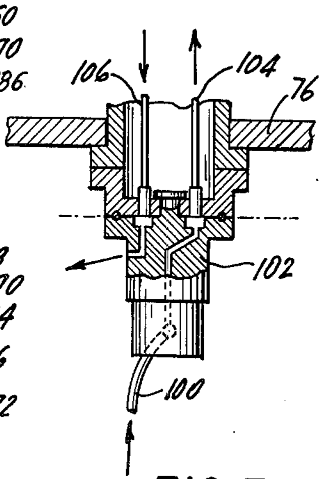
FIG. 7.

TURRET ROLL SLITTING MACHINE

The present invention relates generally to production equipment used to cut wide width rolls of sheet material into narrower rolls of tape or ribbon. The present invention contemplates a machine of that type in which there are provided a multiple number of roll shafts which are mounted on a turret such that while a cutting operation is being performed on a roll mounted on a shaft at a cutting station, an unloading and loading operation may be performed on a shaft at another station. The turret enables the shaft to be moved between the cutting and the loading stations.

A wide variety of sheet-like materials are manufactured in relatively wide widths but are used as consumer products, or as raw materials for further manufacturing operations, in relatively narrow widths. Examples are numerous and include paper, plastic films, adhesive backed materials, and woven and non-woven textiles. Machines have been developed to cut wide rolls of sheet materials into rolls of tape or ribbon and many of such machines have achieved commercial success in the marketplace. A number of such machines have achieved commercial success in the marketplace. A number of such machines have been disclosed in U.S. patents including U.S. Pat. Nos. 3,161,097 and 3,320,841 issued to David N. Judelson and assigned to Oscar I. Judelshon, Inc.

In the typical operations of existing roll-slitting machines, a roll is mounted on the main shaft of the machine and is rotated about its own axis, the cutter blade is positioned for a first cut at a selected axial location and is advanced into the roll to cut the same. Upon the completion of the first cut, the knife is withdrawn and moved axially to the next desired location for a second cut and the second cut is made. Successive cuts are made thereafter until the entire roll has been slit into smaller rolls of the desired widths. Cutting operations are then halted while the individual rolls of narrow lengths are removed from the machine. A new wide roll is then threaded over the main shaft of the machine and positioned and chucked into place and a repeat of the operations is performed. Between each cutting cycle, therefore, there is an unloading and loading cycle during which the actual productive processes of the machine are halted. The efficiencies of manufacturing operations which preceded the introduction of those machines is nevertheless unsatisfactory. An absolute limitation on the efficiency of the machine is the "downtime" or the idle period which exists while the unloading and fresh loading operations are being performed. In the highly competitive and highly cost-conscious marketplace which exists, the inefficiencies of substantial periods of nonproduction are intolerable and it is the purpose of the present invention to eliminate or at least to minimize these inefficiencies.

Accordingly, it is an object of the present invention to provide a new and improved construction for roll-slitting machines or single knife cutters which produce markedly increased manufacturing efficiencies. More specifically, it is an object of the present invention to provide a roll-slitting machine with multiple spindles mounted on a turret so that cutting or slitting operations can be performed on a virtually continuous basis with loading and unloading operations being performed simultaneously therewith.

It is among the objects and features of a machine constructed in accordance with the present invention that multiple spindles or shafts are provided on a turret-like mounting to move those spindles between a cutting station and an unloading station. While a first spindle is moved from the cutting station to the loading station, another spindle is moved in the reverse travel. By such multiple spindle and turret-mounting features, a roll mounted on a first spindle can be cut into desired small segments while, simultaneously therewith, previously cut material may be removed from a second spindle and a new uncut roll may be loaded onto that second spindle. Upon relatively quick movement of the turret, a freshly loaded spindle is moved to the cutting location to be operated on by the cutting mechanism and a freshly cut roll of material is moved to the loading and unloading station. Efficiency can be further increased by providing a turret in which pairs of spindles are moved into the stations such that two spindles are in the cutting station at the same time thereby doubling the amount of material that can be cut on one machine.

Broadly stated, it is an object of the present invention to provide a new and improved roll-slitting mechanism which eliminates or reduces disadvantageous features found in prior art machines and which offers an increase in manufacturing efficiency as compared with prior art units.

In accordance with one illustrative embodiment of the present invention, there is provided a roll-slitting mechanism which includes a multiple number of spindles or shafts on which rolls of material are mounted to be slit in combination with a knife slitter which is mounted for movement along the length of the rollers and for movement radially into the roll such that the rolls can be cut at selected axial locations. The multiple spindles are mounted on a turret which effectively transports them between a cutting station and a loading and unloading station. Both the knife mechanisms and the spindle turret mechanisms are mounted on a unitary frame and drive means are also mounted on that frame to power the movement of the knife mechanisms and the movement of the turret and the spindles. Control means are provided to control the operations of the cutter both in its movements along the length of the cutting station and its radial movement into a roll mounted on the spindles as well as for rotation of the cutting blade. Control means also control the position of the turret and effectively control the drive means which moves the turret to transport spindles between the cutting station and the loading and unloading station.

The above brief description, as well as further objects, features and advantages of the present invention, will be best understood by reference to the following detailed description of one presently preferred embodiment of the invention when taken in conjunction with the accompanying drawings wherein:

FIG. 4 is a sectional view taken along the line 4—4 of FIG. 1 looking in the direction of the arrows illustrating the cutting operation and showing the position and orientation of the spindles in the cutting station and in the unloading and loading station;

FIG. 5 is an enlarged end view of the support and orientation mechanisms which support the free ends of the spindle when in the cutting station;

FIG. 6 is a partial elevational view of the operation of the clamping units in the spindle support and orientation mechanisms; and FIG. 7 is a sectional view taken along the lines 7—7 in FIG. 3 illustrating the manifold connection by which air is delivered to the machine for operation of the spindle chucks.

Figure 1:
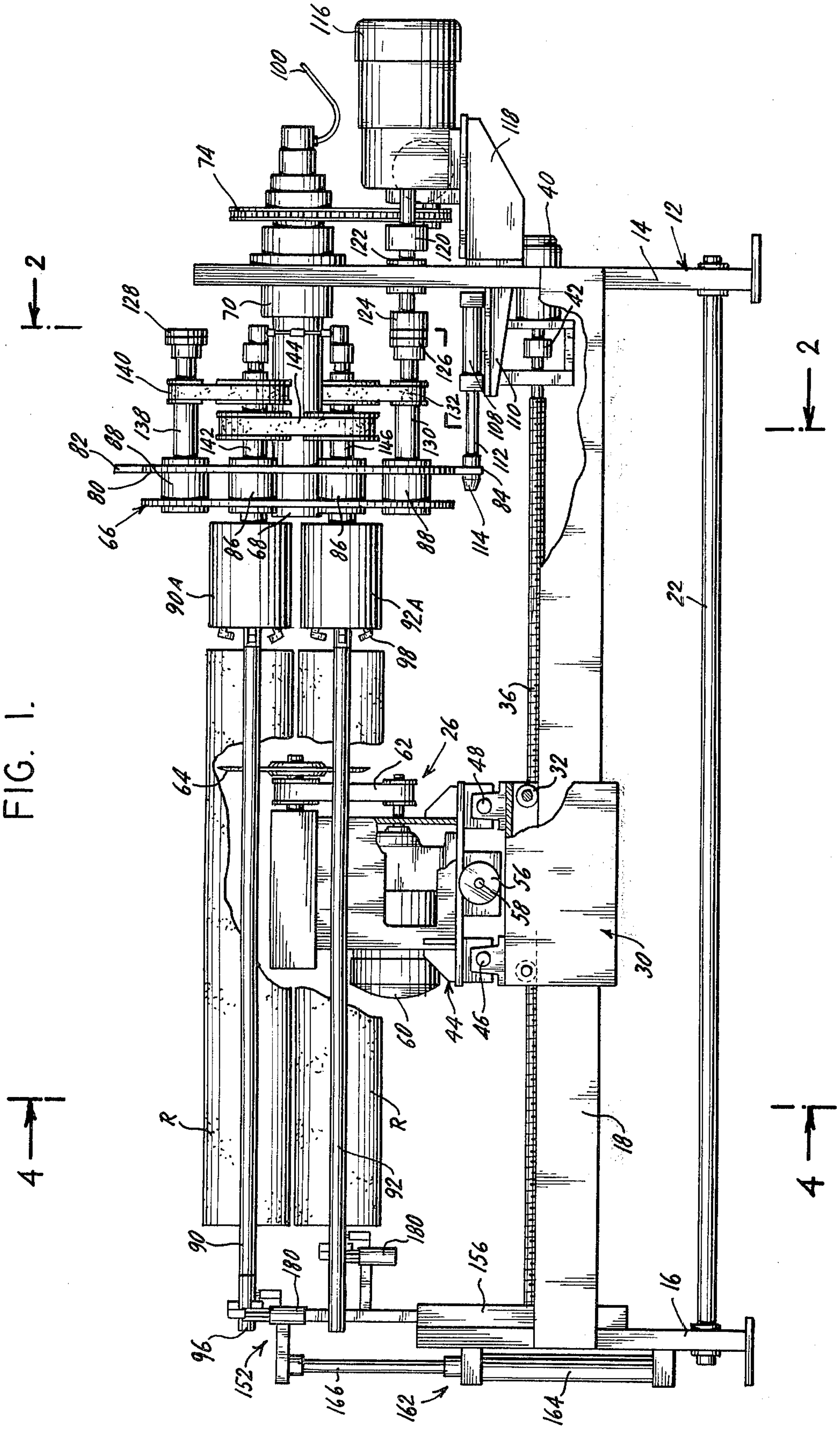
FIG. 1 is a front elevational view of a turret roll-slitting machine, with portions broken away for the purpose of clarity, and with protective covers removed for the same purpose.

Referring now to the drawings, there is shown in FIG. 1 a turret, multiple roll-slitting machine generally designated by the numeral 10 which comprises a main frame 12 on which are mounted the individual elements of the machine. Generally, the frame includes a right-hand or head-end main frame member 14 and a left-hand or tail-end main member 16 connected by appropriate cross rails, 20 and tie rods 22, 24 (see FIGS. 2, 3).

The main components of the machine 10 mounted on the frame 12 are the cutter assembly, generally designated by the numeral 26, and the turret and spindle assembly generally designated by the numeral 28. In the illustrative machine described herein, the cutter assembly 26 is of generally conventional construction and a brief description of it will be given at this point, however, it should be understood that any conventional or future devised cutting mechanism can be used in the machine 10 for affecting the actual cutting of the rolls of material. It will be appreciated that the turret and spindle assembly 28 provides at least one spindle at a cutting station on which the roll of material R is mounted for rotation about its own axis as it is being cut by the cutting mechanism 26. Our brief discussion of the cutting mechanism proceeds in the following paragraph.

The cutting mechanism 26 includes a main carriage 30 which in turn is mounted by appropriate rollers 32 on top of the cross rails 18, 20 thus allowing the cutting mechanism 26 to move from one end of the machine 10 to the other parallel to the axis of the roll R which is to be cut. The rollers 32 are mounted in appropriate shirts 34 which bridge and surround the cross rails 18, 20. The carriage 30 is driven in its lengthwise movement of the machine through the lead screw 36 journaled appropriately in a mounting and transfer lug 38 on the bottom of the carriage 30, and lead screw 36 is driven by the positioning motor 40 which is mounted on the right-hand main frame 14 and is connected to the lead screw by an appropriate coupling device 42. The cutting mechanism includes a secondary carriage 44 which mounts the actual cutting knife for movement radially of the roll R. The secondary carriage 44 is mounted on a pair of cross bars or rails 46, 48 by appropriate sliding bearings. The secondary carriage 44 is moved toward and away from the axis of a roll R by means of a piston and cylinder assembly 52 mounted on the main carriage 30 and connected to the secondary carriage 44 at 54. An adjustment knob 56 and an adjustment lead screw 58 are provided to allow for accurate positioning of the depth of cut in a manner which will be described below. Mounted on the secondary frame 44 is a cutter motor 60 which is connected through a belt 62 to a circular cutting blade 64. Energization of the cutter motor 60 directly causes the rotation of the circular knife cutter 64 which, upon movement of the secondary frame 44 toward a roll R at the machine cutting location, will cause a penetration of the knife blade 64 into the roll R.

The spindle and turret assembly 28 includes four spindles, each with an associated chuck, all mounted on a turret such that two of the spindles are positioned in the cutting station and two in the loading and unloading station and that their respective positions can be reversed upon rotation of the spindle. Drive mechanisms are provided to rotate the spindles when in the cutting station and to rotate the turret when desired. In FIG. 4, the cutting station has been designated by the rotation CS and the loading and unloading station has been designated by the rotation LS.

Figure 2:
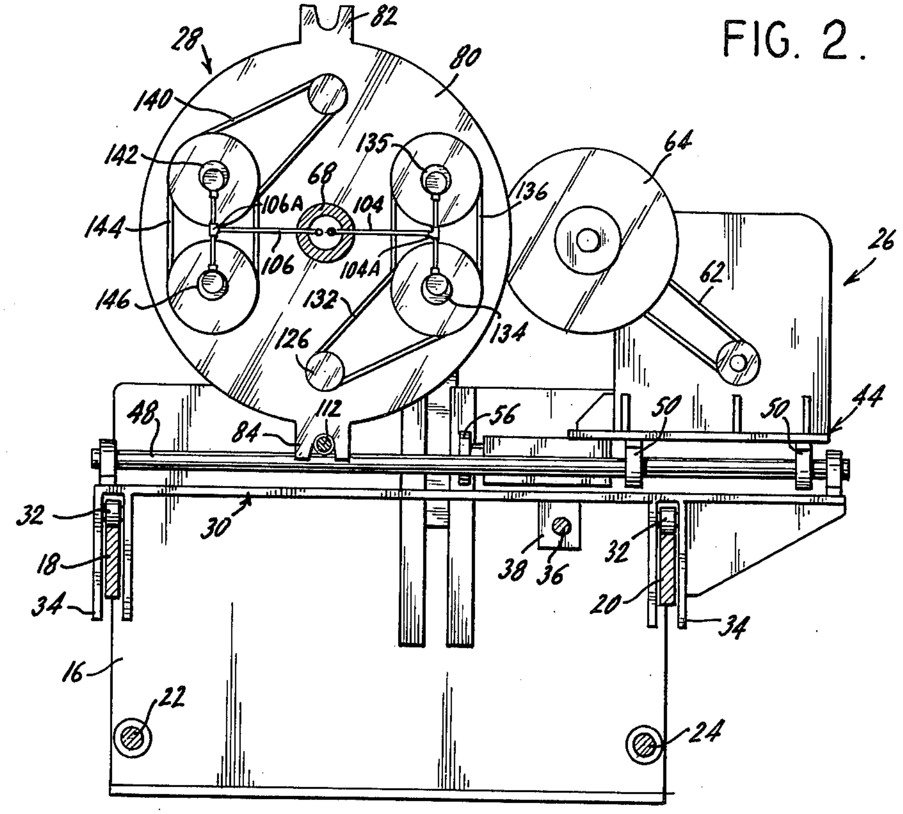
FIG. 2 is a sectional view taken along the line 2—2 of FIG. 1 of the turret roll-slitting machine showing the drive mechanism for the individual spindles and showing the air lines going to the individual chucks on the spindles as well as illustrating the mounting mechanism for the cutting means.
Figure 3:
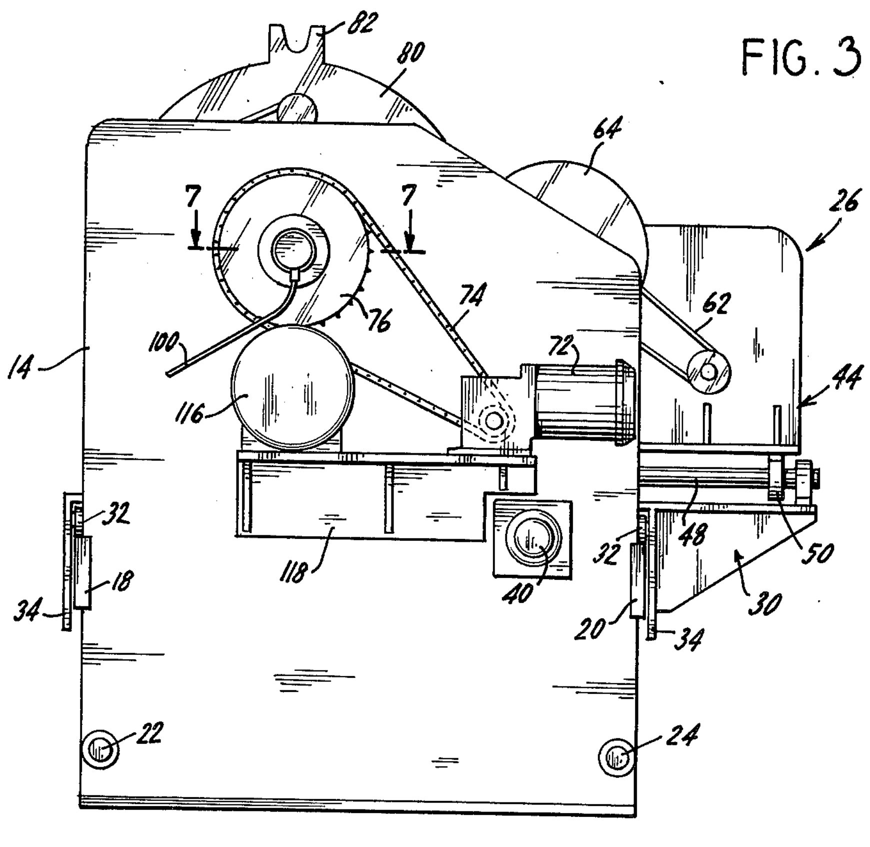
FIG. 3 is an end view of the machine taken from the head end of the machine illustrating the cutting operation and showing the position and orientation of the spindles in the cutting station and in the unloading and loading station.

As may be best seen in studying FIGS. 1, 2 and 4, the turret 66 is mounted on the frame 12 on the main turret axle 68 which is mounted for rotation about its own axis by means of the bearing 70 secured in the right-hand main frame member 14. As will be explained in further detail below, the turret axle 68 may be rotated within its bearing 70 by the turret motor 72 operating through the chaim 74 to the chain pulley 76 which is fixed to the portion of the turret axle which protrudes outwardly from the end of the right-hand frame member 14. The turret 66 is constructed of a pair of parallel circular plates 78, 80 the latter of which has locating extensions 82, 84 which are used to define the stopping points for the rotation of the turret 66. The turret plates 78, 80 are spaced apart from each other a short distance and are used to mount six bearings, four of which are spindle bearings 86 and two of which are drive shaft bearings 88. The spindle bearings 86 support four roll spindles 90, 92 forming the first pair of roll spindles and 94, 96 forming the second pair of roll spindles. Each of the roll spindles has an associated air chuck 90A, 92A, 94A and 96A. In FIG. 1, chucks 90A and 92A are visible, their counterparts in the second pair are directly behind them and are therefore hidden from view. Also in FIG. 1, we see the spindles 90, 92 in the foreground (note that spindle 92 is somewhat longer than spindle 90) and behind them are visible rolls of material R mounted on spindles 94, 96. Due to the variation in the length of the spindles, the end portion of spindle 96 is visible behind spindle 90.

The air chucks 90A, 92A, 94A, 96A are of a type more completely described in pending U.S. application Ser. No. 448,056 entitled IMPROVED AIR CHUCK FOR ROLL SLITTING MACHINE, filed on Mar. 4, 1974. It is sufficient for the present explanation of the machine 10 to note that the gripper members 98 (see FIGS. 1 and 4) of the chuck members, under the influence of pneumatic pressure, grip the conventional cardboard core of the rolls R. The chucks are driven about their respective spindles which remain stationary and thus rotate the rolls of material R about those stationary spindles. As can be seen in FIG. 4, a portion of the face of each of the spindles 90, 92, 94, 96 is flattened to provide a clearance space for the blade 64 to penetrate through the core of the roll R thereby to cut that core. Pneumatic pressure for the air chucks is delivered through the air tube 100 to a manifold 102 (see FIG. 7) which functions to deliver pressurized air to those chucks which are in the cutting station CS and to bleed air from those chucks whick are moved into the loading and unloading station LS. As may be best seen in FIGS. 7 and 2, two air lines 104, 106 extend from the manifold into the turret axle 68 and branch off into lines leading to the respective air chucks.

The turret 66, when rotated by the turret motor 72 and is accurately positioned by means of the locating members 82, 84. Specifically, a turret-loading piston and cylinder assembly 108 is located on a bracket 110 on the right-hand frame member 114 (see FIG. 1) and includes a piston rod 112 which has a conically shaped locating ram 114. The locating ram 114 is sized to be complementary to the notches formed in the locating members 82, 84. The timing mechanisms and control mechanisms associated with the machine 10 are such that the piston rod 112 is retracted when the turret 66 is rotated and is extended into the position shown in FIG. 1 during the cutting cycle of the machine. The locating ram 114 is driven between the bifocated sections of the locating members 82, 84 thus accurately positioning turret 66 and maintaining it in rigid position during the cutting operation.

The drive for the rotation of the air chucks and rolls R is best shown in FIGS. 1 and 2. A roll-driving motor 116 is positioned on an appropriate bracket 118 on the frame 14 and driving force is transmitted through an appropriate control clutch 120 and through a bearing 122 in the right-hand frame member 114 to the driving portion 124 of a 2-part drive clutch. The other portion of the drive clutch is located on the moveable turret 66 and is changeable as the turret rotates through its 180° rotation. In FIG. 1, the second portion of the clutch is the driven clutch member 126, but when the turret is rotated, from the other side of the turret 66 the driven clutch member 128 is mated with the driving member 124. Clutch portion 126 is effective to drive air chucks 94A and 96A whereas, member 128 drives the other two air chucks 90A and 92A. Specifically, driven clutch member 126 connects to a transmission shaft 130 mounted in the drive bearing 88 on the turret 66. Rotational movement of the transmission shaft 130 is transmitted through a belt 132 and appropriate pulleys to the shaft 134 which is mounted in one of the spindle bearings 86 and which is connected to air chuck 94A. The similar shaft 135 for air chuck 96A is connected to the shaft 134 by means of the belt 136 (see FIG. 2) such that the two air chucks 94A and 96A rotate at the same time.

When the turret 66 is rotated, driven portion 128 of the detachable chuck is brought into contact with the driver portion 124 in order to drive the air chucks 90A and 92A. As may be seen in FIGS. 1 and 2, driven portion 128 is attached to a shaft 138 mounted in bearing 88 and through an appropriate belt 140, drives the shaft 142 associated with air chuck 90A. Air chuck 92A is driven at the same time and at the same speed and direction by means of the belt 144 which is connected to the shaft 146 which is associated with that air chuck. It will thus be appreciated that driving means are provided through the motor 116 to those air chucks which are located in the cutting station CS of the machine to rotate those air chucks at the same speed and in the same direction of rotation. The two air chucks and spindles which are on the loading and unloading station of the machine 10 will not be connected to the drive motor 116 since their drive train will be connected to the driven clutch member 124. When the turret is rotated through its 180° movement, the first pair of air chucks will be disengaged from the power source and the second set will be engaged. Simultaneously with the disengagement of one drive chain and engagement of the other, the first set of air chucks will be depressurized releasing the roll of materials thereon and the other set of air chucks will be pressurized to engage the rolls of material R which have been loaded thereon. As can be seen in FIG. 7, the manifold 102 has a pressure line from the supply 100 and a bleed line alternatively engageable with the air lines 104 and 106 respectively. The manifold is stationary and the turret assembly pivots at the connection 148 and is sealed by the O ring as shown. Appropriate mating sliding connections for the air lines are provided as shown such that the lines 104 and 106 are alternatively pressurized and relieved upon rotation of the turret 66.

The spindle shafts 90, 92, 94, 96 are each mounted within their respective air chucks on bearings which allow the shafts to remain stationary as rolls R are rotated around them under the influence of the respective rotating chucks. The shafts are maintained in non-rotating condition with their clearance faces 150, formed along the length of each roll (see FIGS. 4, 5 and 6), properly aligned facing directly into the axis of the slitting blade 64. As is well understood by those having knowledge of the art, it is desirable to cut the cardboard core of the roll R as well as the material on the core in order that each of the smaller cut rolls also are provided with a core. The spindle shafts, when in the cutting station CS, are held in proper orientation and are also supported at their free ends by means of the shaft support and orientation mechanism generally designated by the numeral 152 and best shown in FIGS. 5 and 6.

The orientation and support mechanism 152 is mounted on the left end frame member 16 by means of a vertical support 154 which is mounted in tracks 156 for vertical movement. Extending from the vertical support arm 154 is a lower horizontal support arm 158 and, above it, an upper horizontal support arm 160. These horizontal support arms each provide the mounting for the mechanisms which directly engage the free ends spindle shafts in the cutting station CS. The entire assembly is movable vertically under the impetus of a piston and cylinder assembly 162 consisting of a pneumatic cylinder 164 with an internal piston which drives the piston rod 166, the end of which is connected to a connecting arm 168 attached to the vertical support arm 154. When the piston and cylinder assembly 162 is extended, the vertical and horizontal support arms 154, 158 and 160 move upwardly into engagement with the spindle shafts for support of same and when the piston and cylinder assembly 162 is contracted, the entire orientation and support mechanism 152 moves downwardly to a clearance position out of engagement with the spindle shafts.

At the end of each of the horizontal support arms 158, 160 of the orientation and support mechanism 152, there are provided the specific elements which serve to engage the spindle shafts for support and orientation. Description will be made of one of the two pairs of these mechanisms and it will be understood that the other pair is constructed and functions in the same manner. A lower pair of rollers 170 is mounted on an appropriate bifurcated bracket 172 at a point extending into the bifurcated region such that the outer face of the spindle shaft is cradled and supported by the rollers 170. The rollers 170 for the upper spindle shaft are mounted directly on the vertical support arm 154 which is bifurcated at its upper end in the same manner as the bracket 172. A third roller 174 is mounted above the lower rollers 172 to maintain the shaft 94 tightly in position. This third or upper roller 174 is mounted on a pivot lever 176 which is pivoted at 178 on the bracket 172 (or the arm 154 for the upper unit) and is powered for movement toward and away from the lower rollers 170 by a piston and cylinder assembly 180 connected at one end to the lever 176 and at the other end to a bracket 182 on the bracket 172. The opened and closed positions of the roller 174 is illustrated in the upper portion of FIG. 6; the solid line configuration shows the position of the device when a spindle shaft is firmly clamped within the three rollers 170, 174 and the dotted line configuration illustrates the assembly as it exists when the shaft is released by contraction of the piston and cylinder assembly 170.

After the turret 66 has been rotated to bring a fully loaded spindle shaft into the cutting station CS, the orientation and support mechanism 152 is raised into the position as shown in the drawings thus capturing the spindle shafts within the bifurcated regions of both the upper and lower support units at the ends of horizontal arms 158, 160. The piston and cylinders 180 are then extended to swing the upper rollers 174 over and above the spindle shafts to bring the unit into configuration as shown in FIGS. 5 and 6. The spindle shafts may not necesarily be oriented with their clearance faces 150 perpendicular to the radius to the center of the slitting blade 64 and, of course, the mechanisms as described thus far make no provision for maintaining such an orientation. Those functions are provided by a spring-loaded locating pin 184 which is mounted in a housing 186 on the bracket 72 and which extends upwardly into engagement with the spindle shaft when the same is resting upon the lower rollers 172. A complementary opening 188 is formed in the bottom of each of the spindle shafts and oriented such that their respective clearance faces 150 are properly positioned relative to the slitting blade 64 in the cutting station CS. When the spindle shafts are not properly aligned, the pin 184 is pressed downwardly into the housing 186; as the spindle shaft 150 is rotated and the opening 88 becomes aligned with the pin 184, the pin 184 will move upwardly under the spring bias and engage itself into the opening thereby correctly orienting the clearance face 150 of the spindle shaft. The pin 184 is effective to maintain the orientation of the spindle shaft during the cutting operation.

The foregoing description of the mechanical features of the machine 10 will be further appreciated by considering a typical cycle of complete operations of the machine. Operations are commenced by loading a pair of rolls of material R on spindles located in the loading station LS, i.e., on those two spindles which are at the point furthest removed from the slitting blade 64 and free of the orientation and support mechanism 152. The machine operator then activates those controls which are effective to swing the turret 66 through a 180° rotation, specifically, the locating ram 114 is withdrawn from the locating member 82 and the turret motor 72 drives the turret through 180° to the position shown in the drawings at which time the locating ram 114 engages the other locating member 84 on the turret. When the turret reaches this position, the two rolls R and the spindle shafts upon which they have been mounted, in this case, shafts 94 and 96, are in the cutting station CS, and the other two shafts are moved into the loading station LS. When the turret 66 reaches this position, the air line 104 is connected to the air supply 100, thus energizing the air chucks on spindles 94 and 96 causing them to engage the core of the roll R.

Upon energization of the control mechanisms for moving the turret 66, the spindle support and orientation mechanism 152 is disengaged from the ends of the spindle shafts in the cutting station and is moved to a clearance position. Specifically, the piston and cylinder assemblies 180 contract and the clamping rollers 174 are removed from the tops of the spindles and the entire assembly 152 is lowered by means of the piston and cylinder assembly 164 to a clearance position below the spindles in the cutting station CS. After the rotation of the turret has been completed, the control means in the machine 10 elevates the spindle orientation and support mechanism 152 back into the position shown in FIGS. 5 and 6 and is effective, through the piston and cylinder assemblies 180, to clamp the spindle shafts then located in the cutting station CS. The locating pins 184 and spindle shaft openings 188 effectively orient the clearance faces 150 of the shafts in proper position as shown in the drawings.

When the turret 66 is correctly positioned, the air chucks are energized and the support and orientation mechansim engaged with the free ends of the spindle shafts, the controls which commence the cutting operations are activated. Typically, the rolls R would be cut starting at the foot end of the machine (the left end as viewed in FIG. 1) with the slitting blade 64 moving radially into the rolls R as those rolls are rotated by the force from the motor 116 through the clutch 124–126 and then through the appropriate belts, pulleys and shafts to the air chucks 94A and 96A. The cutting blade 64 penetrates into the rolls R to the cardboard core of those rolls and then through the cardboard core with clearance provided by the spindle shafts at their respective clearance faces 150. The slitting blade 64 is then retracted and the entire carriage 30 is moved through the next desired position for slitting of the rolls R. The slitting operation is performed repeatedly at each desired location along the length of the rolls R. By techniques known to those skilled in the art, such slitting operations can be governed by controls which automatically index the slitting mechanism to perform these cutting operations.

At the same time as the rolls are being slit on spindle shafts 94, 96 in the cutting station CS, previously cut rolls are removed from the spindles 90, 92 in the loading and unloading station LS. It will be appreciated that when the turret 66 is moved into the position as shown in the drawings, air line 106 will be connected with the bleed port in the manifold 102, thus allowing the gripping jaws of the chucks 90A and 92A to open releasing the previously cut rolls and allowing for fresh rolls R to be threaded over the spindle shafts 90, 92. Since the spindle shafts 90, 92, when in the loading station LS, are free of the end support mechanism 152, it is a simple matter to thread the rolls of material R over those spindle shafts.

Upon completion of the cutting of the rolls R on spindles 94, 96 and the loading operation on spindles 90, 92, the spindle shaft orientation and support mechanism 152 is withdrawn to its clearance position, the locating ram 114 is withdrawn from the turret 66 and the turret 66 is rotated to transport the cut rolls R to the loading and unloading station LS and to transport the freshly loaded rolls on the other two spindles, 90, 92, into the cutting station CS. When the spindle movement has been completed, the locating ram 114 is reengaged with the mating locating means, the orientation and support mechanism 152 is moved into engagement with the free ends of the spindle shafts in the cutting station CS and the air chucks 90A and 92A are pressurized to cause the chuck jaws 98 to clamp onto the cardboard core of the rolls R. The machine operator then activates the control means to commence the next cutting operation and while that is in progress, the operator removes the cut rolls from the spindles then in the loading and unloading station LS and thereafter loads fresh rolls R onto those spindles. The operation proceeds on a repeating basis.

The control means for the various motors and piston and cylinder assemblies can be of a variety of different designs ranging from simple hand-operated switches and valves to more sophisticated logic-controlled systems. They are not detailed here since their arrangement is within the knowledge of those skilled in the art and are not considered to be the subject of inventive activity. For purposes of understanding the present machine, they can be considered to be simple hand-operated switches although, as described above, it is generally advantageous to provide a more sophisticated control means in which all or selected parts of the cycle of operations is automatic or semi-automatic in nature.

The above description is given for one illustrative embodiment of the subject matter disclosed. A number of modifications of greater and lesser extent can be made without departing from the spirit and scope of the invention. Those skilled in the art will see many variations which can be easily made from the particular details which are shown and described above.

What I claim is:

1. An improved roll cutting machine for cutting rolls of sheet material at a cutting station in said machine while simultaneously unloading previously cut rolls from said machine and loading new rolls to be cut thereon at a loading and unloading station of said machine comprising:

a. frame means;

b. a turret assembly mounted on said frame means for rotational movement about a turret axis;

c. multiple spindle shafts mounted on said turret and extending parallel to said turret axis including means to support rolls of material to be slit and chuck means engageable with said rolls of sheet material when mounted on spindle shafts;

d. said turret being rotatable to transport at least one spindle shaft to a cutting station at a first location about said turret axis while simultaneously moving at least one other spindle shaft to a loading and unloading station at a second location about said turret axis;

e. cutting means mounted on said frame for longitudinal movement parallel to said spindle shafts and for movement in a plane perpendicular to said spindle shafts to affect cutting of a roll of material mounted on said at least one spindle shaft in said cutting station; and f. drive means for driving said cutting mechanism.

2. A roll slitting machine in accordance with claim 1 where said turret assembly includes, drive means for rotating said chuck means to rotate rolls of material mounted on said spindle shafts and control means for coordinating the operations of said cutting mechanism and said chuck means.

3. A roll slitting machine in accordance with claim 1 wherein said cutting mechanism comprises a single circular blade mounted on a first carriage movable transverse to said spindle shafts and a second said carriage movable parallel to said spindle shafts.

4. A roll slitting machine in accordance with claim 1 having four spindle shafts, two of which are in said cutting station at the same time and positioned to be engaged by said cutting means simultaneously while the other of two said spindle shafts are in said loading and unloading station.

5. A roll slitting machine in accordance with claim 2 wherein each spindle shaft has chuck means and the chuck means of said at least one spindle shaft in said cutting station is automatically engaged when said spindle shaft is in said cutting station and the said chuck means is automatically disengaged when said spindle shaft is moved to said loading and unloading station.

6. A roll slitting machine in accordance with claim 1 wherein said turret moves through a 180° rotation transporting said spindle shafts between said cutting station and said loading and unloading station and including locating means to precisely locate said spindle at the end of such 180° movement.

7. A roll slitting machine in accordance with claim 2 wherein said spindle shafts at their ends opposite from chuck means are unsupported when in the loading and unloading station and wherein spindle shaft support means are provided at said cutting station for supporting the free ends of spindle shafts when in said cutting station.

8. A roll slitting machine in accordance with claim 2 having control means for coordinating the operations of said drive means and said chuck means for performing a cycle of operations in which rolls of material mounted on said spindle shafts in said cutting station are cut by said cutting means while previously cut rolls are removed and uncut rolls are loaded onto said spindle shafts in said loading and unloading station and wherein, upon completion of cutting operations, said turret is rotated to bring at least one spindle shaft loaded with an uncut roll into said cutting station and to bring at least one other spindle shaft loaded with a cut roll into said unloading and reloading station.

9. A roll slitting machine in accordance with claim 2 wherein said spindle shafts are unsupported at their ends opposite from said chuck means when in said loading and unloading station and wherein support means are provided at said cutting station, means mounting said support means for movement to a support location when said spindle shafts are moved by said turret into said cutting station and for movement to a clearance location prior to said turret rotating to move said spindle shafts out of said cutting station and control means to coordinate the movement of said support means and said turret rotation.

* * * * *